Oct. 25, 1932. A. P. LOFSTRAND 1,884,009
PLOW
Filed Feb. 9, 1932 2 Sheets-Sheet 1
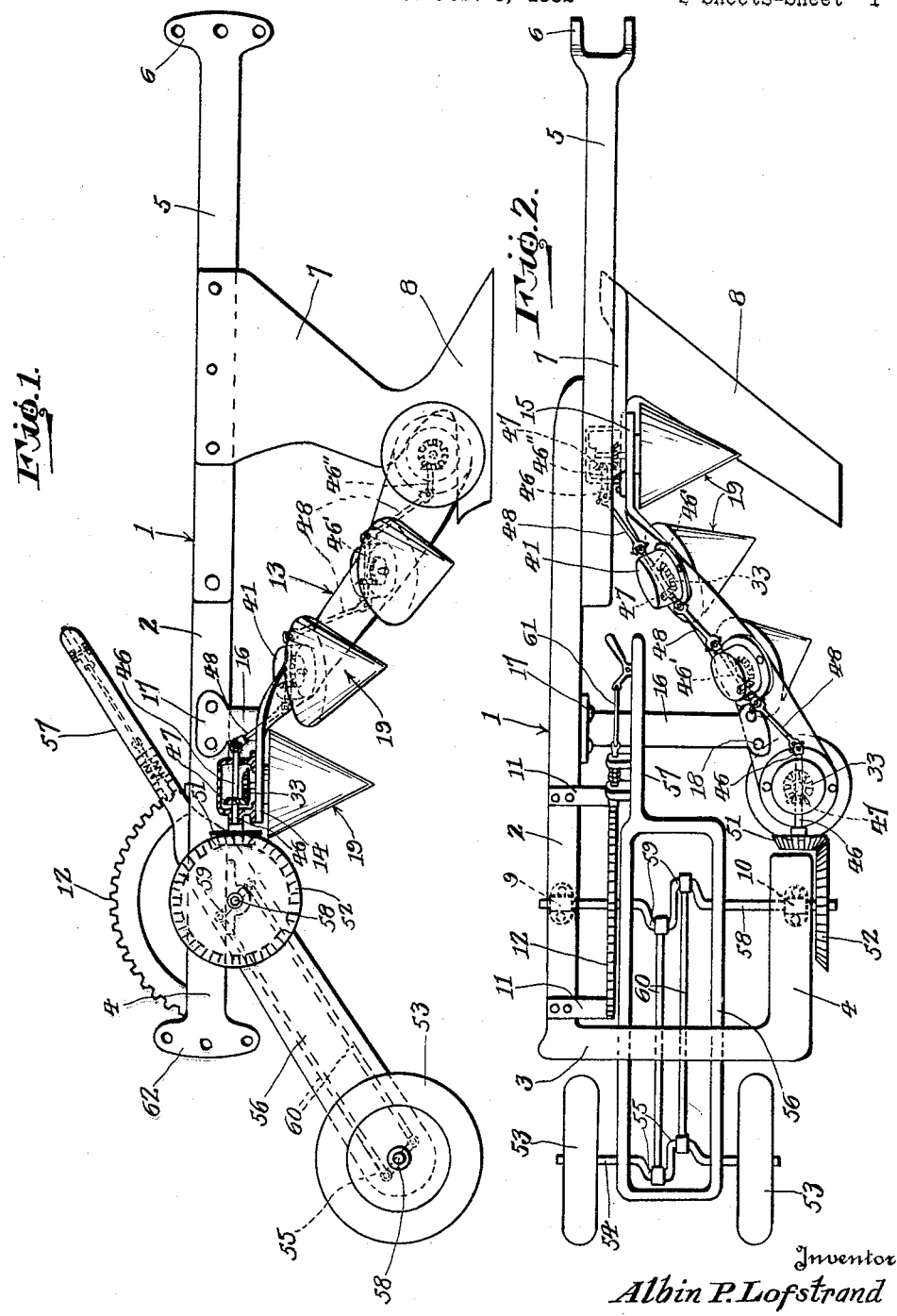
Inventor
Albin P. Lofstrand
By Geo. P. Kimmel
Attorney

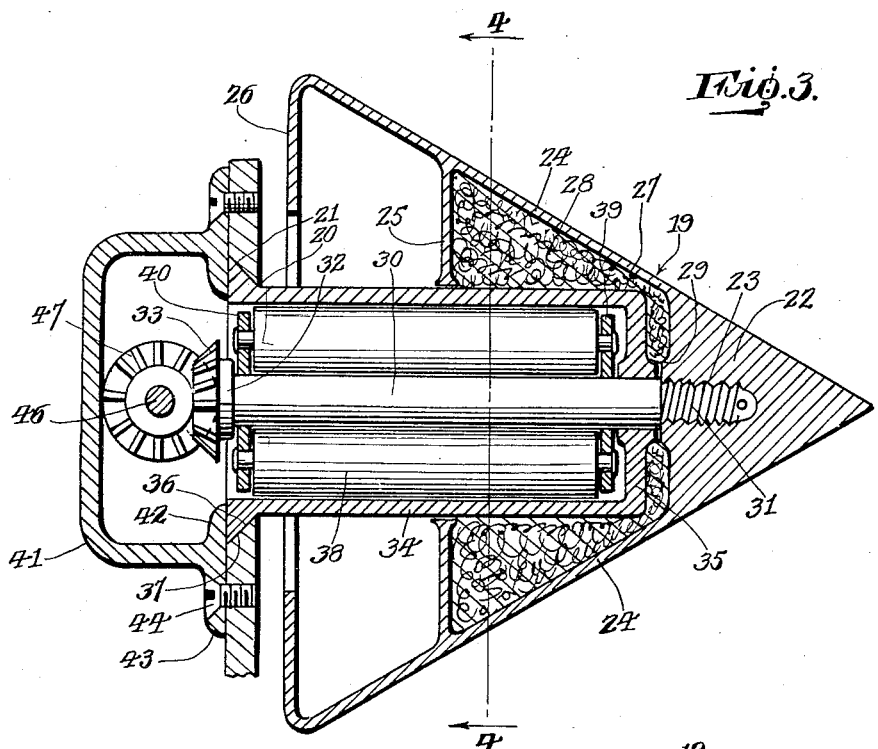
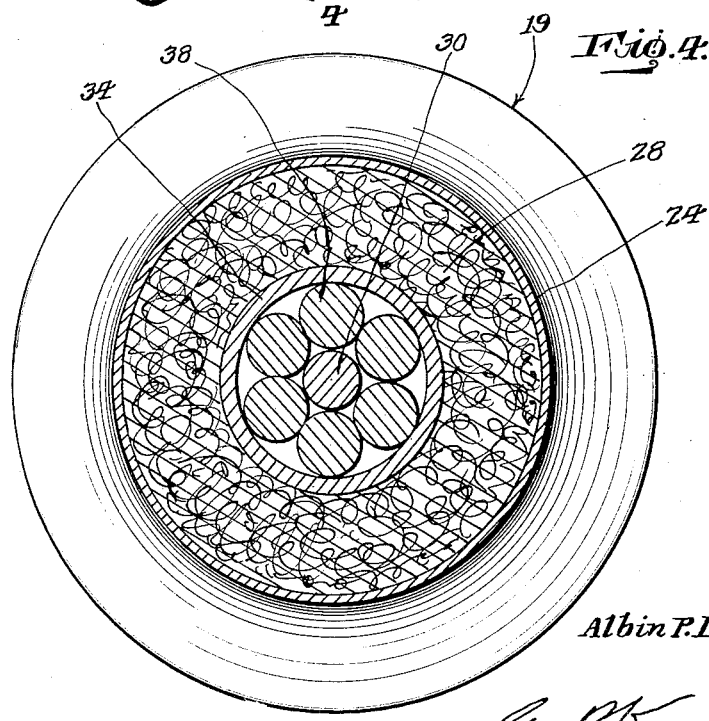

Patented Oct. 25, 1932

1,884,009

UNITED STATES PATENT OFFICE

ALBIN PAULUS LOFSTRAND, OF CHICAGO, ILLINOIS

PLOW

Application filed February 9, 1932. Serial No. 591,898.

This invention relates to a plow and has for its object to provide, in a manner as hereinafter set forth, a ground working device of the class referred to including a mold board of the soil rollaway type formed from a series of connected together, spaced, tapered, simultaneously rotatable, gear driven, soil abutting elements angularly disposed with respect to each other, each being carried by a combined bearing and suspension device therefor, and with such elements acting during the plowing to lift and pull under the furrow to create traction instead of resistance thereby preventing retardation of the forward movement of the plow.

A further object of the invention is to provide, in a manner as hereinafter set forth, a plow having a mold board including a series of spaced, tapered, simultaneously rotatable soil abutting members angularly disposed with respect to each other and so constructed and arranged to keep clean of gummy soil during the rollaway of the latter when plowing.

Further objects of the invention are to provide, in a manner as hereinafter set forth, a ground working device of the class referred to which is comparatively simple in its construction and arrangement, strong, durable, compact, thoroughly efficient in its use, readily assembled and comparatively inexpensive to set up.

To the above ends essentially and others which may hereinafter appear, the invention consists of such parts, and such combination of parts which fall within the scope of the invention as claimed.

In the drawings:

Figure 1 is a side elevation of a plow in accordance with this invention.

Figure 2 is a top plan view thereof.

Figure 3 is a horizontal sectional view illustrating the arrangement of a soil abutting element relative to a combined bearing and suspension device therefor.

Figure 4 is a section on line 4—4 Figure 3.

The plow includes a body part generally indicated at 1 and which consists of a side bar 2, a rear bar 3 and a side bar 4. The body part 1 is an integral structure. The side bar 2 is of materially greater length than the side bar 4. The bars 2 and 4 are arranged in parallelism and project forwardly from the ends of the rear bar 3. Secured to the inner face of the side bar 2 at the forward portion thereof and extending forwardly from such bar is a beam 5 having its forward end provided with a hitching means 6 for connecting the plow to a traction element. Secured to the inner side of the beam 5 and depending therefrom is a standard 7 which terminates in the plow share 8. Secured upon the upper face of the bars 2, 4, arranged in parallelism and positioned in proximity to the bar 3 are bearings 9, 10. Secured to the bar 2 are spaced inwardly extending arms 11 which support a vertically disposed segmental rack 12. The purpose of the rack 12 will be presently referred to.

The mold board includes a torsionally twisted, upstanding, curved supporting member 13 having the upper and lower ends thereof of rectangular contour, but disposed at right angles to each other. The upper end of the member 13 is indicated at 14 and its lower end at 15. The end 14 is positioned upon its lower face and the end 15 upon its lower lengthwise edges. The end 14 is arranged in proximity to bar 4, but below the latter. The end 14 is secured to the bar 2 by a suspension member 16. The end 15 is secured to the standard 7. The supporting member 13 inclines downwardly in a direction towards the standard 7. The member 16 is fixedly secured, as at 17 to the bar 2 and as at 18 to the upper portion 14 of the supporting member 13.

The mold board is illustrated by way of example as being provided with four closely arranged, tapered, conoidal shaped, rotatable soil abutting members 19 providing a rollaway for the soil, but this number may be increased or diminished. The supporting member 13 is provided with spaced openings 20 corresponding in number to the number of members 19. Each opening 20 has a beveled wall 21. The openings are equally spaced and angularly disposed with respect to each other.

Each soil abutting member includes a substantially solid pointed end portion 22 formed with an axial socket 23 having a threaded wall and opening at the rear of such portion. Extending rearwardly from the portion 22 is a hollow portion 24 provided intermediate its ends with an inwardly extending annular flange 25 and its rear end with an inwardly extending annular flange 26. The flange 25 in connection with the rear end of the pointed portion 22 provides a chamber 27 in which is arranged a packing 28. The flange 25 provides a dirt arrester for the chamber 28. The rear of the pointed portion 22 has a central boss 29. Fixedly secured and arranged axially of the member 19 is a rotating shaft 30 therefor. The forward end of shaft 30 has a reduced threaded extension 31 which engages with the threads of the socket 23 for anchoring shaft 30 to member 19. The shaft 30 is of a length to extend rearwardly from member 19 and has its rear end provided with a beveled gear 33, the latter being fixed to shaft 30 and is formed with a forwardly directed hub 32.

A combined bearing and suspension device is associated with each member 19 and such device includes a sleeve 34 formed in its forward end with an inwardly extending annular flange 35 supporting the shaft 30. The rear end of sleeve 34 has an outwardly directed annular flange 36 formed with a beveled face 37. The sleeve 34 extends through an opening 20 and its beveled face bears against the beveled wall 21 of the opening. Arranged within the sleeve 34 and surrounding the shaft 30 is a series of roller bearings 38 mounted at their forward ends in a ring 39 and at their rear ends in a ring 40. The hub 32 arrests the shifting of ring 40 in one direction. The shaft 30 extends through the rings 39 and 40. The sleeve 34 is coupled with the supporting member 13 to prevent the lengthwise shifting of such sleeve relative to member 13, by a cap member 41 having inwardly and outwardly extending flanges 42, 43 respectively. The flange 42 overlaps the rear end of sleeve 34 and retains the latter in member 13. The flange 43 is secured by holdfast devices 44 to the member 13. The flange 35 is spaced from the pointed portion 22 and a packing 28 is interposed between said flange 35 and portion 22.

The angular disposition of the openings 20 provide for the sleeves 34 to be disposed at an angle with respect to each other. Each member 19 extends in the same direction as that sleeve 34 with which it is associated. Each sleeve 34 extends through the flanges 25 and 26 of that member 19 with which it is associated to a point in close proximity to portion 22 of member 19. Each sleeve is stationary. The members 19 revolve around the sleeves. The shafts 30 rotate within the sleeves and bodily carry members 19 therewith.

An operative drive connection is provided for the shafts 30 to cause the simultaneous operation of the members 19. The said drive connection includes a set of rotatable shafts, one arranged above the other and with the upper shaft of the set indicated at 46, the intermediate shafts of the set at 46' and the lower shaft of the set at 46''. The shafts 46 and 46' extend through and are journaled in the cap members 41, other than the lower cap member. The shaft 46' extends partly through and is journaled in the other cap member 41. The shafts 46, 46' and 46'' carry bevel gears 47 meshing with the bevel gear 33 for driving shafts 30 to provide for the operating of members 19. One end of shaft 46 is universally joined at one end to the upper one of a set of transmission shafts 48 which are universally joined to shafts 46' and 46''. The other end of shaft 46 has fixed thereto a bevel gear 51 of greater diameter than the gear 47. Meshing with, of greater diameter than and driving gear 51 is a bevel gear 52.

Arranged at the rear of the plow is a pair of furrow wheels 53 fixed to an axle 54 provided with a pair of cranks 55. The axle 54 is journaled in the sides of an upstanding forwardly inclined adjustable frame 56 having its upward portion provided with a handle member 57. Journaled in the bearings 9, 10 is a drive shaft 58 for the gear 52. The shaft 58 is operated from axle 54 and for such purpose the shaft has a pair of cranks 59 which are coupled with the cranks 55 by connecting rods 60. The shaft 58 extends through the sides of frame 56. As the plow travels the rotation of the furrow wheels 53 will provide through the shaft 58 for the simultaneous operation of members 19.

The frame 56 can be adjusted and held in its adjusted position and for such purpose a spring controlled dog and lever mechanism 61 is carried by the handle member 57 and which coacts with the rack 12. The frame 56 extends rearwardly from the bar 3. The wheels 53 act as a support for the rear end of the plow. The rear end of body part 1 has a hitch 62.

What I claim is:—

1. In a plow, a rollaway mold board including a set of rotatable, conoidal shaped soil abutting elements, arranged one above the other, angularly disposed with respect to each other and each including a rotating shaft therefor arranged axially thereof and extending rearwardly therefrom, means for simultaneously driving said shafts, and a combined suspension and bearing device for and carrying each element.

2. In a plow, a rollaway mold board including a set of rotatable, conoidal shaped soil abutting elements, arranged one above the other, angularly disposed with respect to each other and each including a rotating shaft therefor arranged axially thereof and extending rearwardly therefrom, means for simultaneously driving said shafts, a combined suspension and bearing device for and carrying each element, a supporting member for said devices, and cap members secured to the supporting member for securing said devices to the latter and for enclosing one end of said shafts.

3. In a plow, a rollaway mold board including a set of simultaneously rotatable, conoidal shaped soil abutting elements, arranged one above the other and angularly disposed with respect to each other, and a combined suspension and bearing device for each of said elements, each of said elements having a part positioned axially of said device and a part encompassing said device.

4. In a plow, a rollaway mold board including a set of simultaneously rotatable, conoidal shaped soil abutting elements, arranged one above the other and angularly disposed with respect to each other, a combined suspension and bearing device for each of said elements, each of said elements having a part positioned axially of said device and a part encompassing said device, supporting means for said devices, and retaining means for said devices secured to said supporting means.

5. In a plow, a rollaway mold board including a set of simultaneously rotatable, conoidal shaped soil abutting elements, arranged one above the other and angularly disposed with respect to each other, a combined suspension and bearing device for each of said elements, each of said elements having a part positioned axially of said device and a part encompassing said device, supporting means for said devices, retaining means for said devices, an operative drive connection for and between said elements for simultaneously operating the latter, said drive connection being supported by said retaining means, a supporting structure for the rear of the mold board assembly, a pair of wheels below said structure, and a driving means for said drive connection operated from said wheels on the travel of the plow.

6. In a plow, a rollaway mold board including a set of simultaneously rotatable, conoidal shaped soil abutting elements, arranged one above the other and angularly disposed with respect to each other, a combined suspension and bearing device for each of said elements, each of said elements having a part positioned axially of one of said devices and a part encompassing the latter, supporting means for said devices, retaining means for said devices secured to said supporting means, and an operative drive connection for and between said elements for simultaneously operating the latter, said drive connection being supported by said retaining means.

In testimony whereof, I affix my signature hereto.

ALBIN PAULUS LOFSTRAND.